Patented Apr. 8, 1952

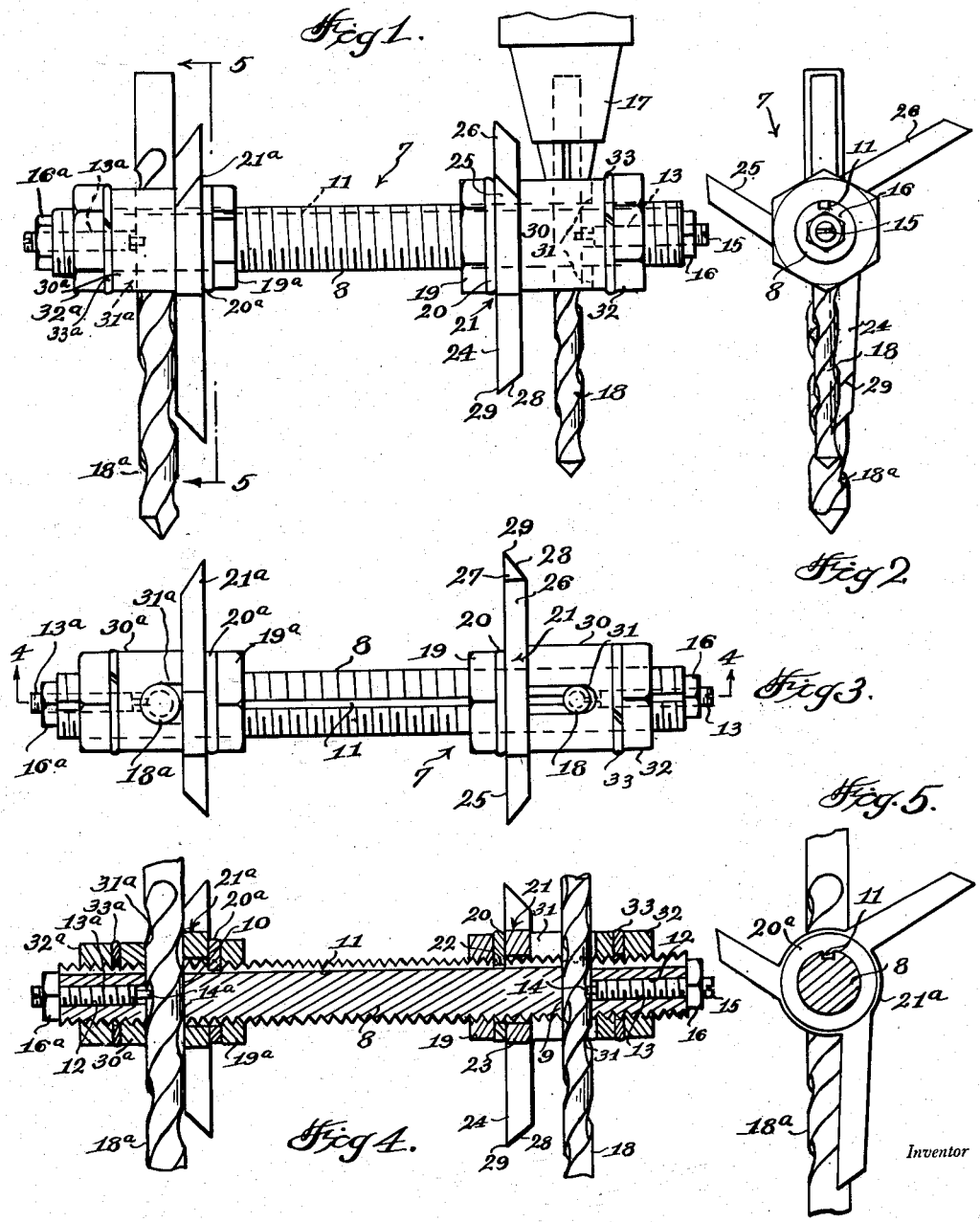

2,591,847

UNITED STATES PATENT OFFICE 2,591,847

TOOL FOR CUTTING CIRCULAR HOLES

Louis Masini, Highwood, Ill.

Application May 31, 1951, Serial No. 229,048

6 Claims. (Cl. 77—69)

This invention relates to a novel tool or implement adapted to be applied to and form an attachment for a conventional drill bit for cutting circular holes of different diameters, larger than the diameter of the drill bit and which is capable of cutting a circular hole of a diameter only slightly greater than the diameter of the drill bit.

More particularly, it is an aim of the present invention to provide a circular cutter adapted to be mounted on a drill bit for use with a conventional drill press for cutting circular holes of different diameters and which can be accurately adjusted for cutting a circular hole of a desired diameter.

Another object of the invention is to provide a circular hole cutting attachment for drill bits capable of being used in drill bits of different diameters and of different lengths and including cutting elements having blades of different lengths capable of being selectively positioned for use with a drill bit, depending upon the thickness of a workpiece in which a circular opening is to be cut.

Various other objects and advantages of the invention will hereinafter become more fully apparent from the following description of the drawing, illustrating a presently preferred embodiment thereof, and wherein:

Figure 1 is a side elevational view of the invention;

Figure 2 is an end elevational view thereof looking from right to left of Figure 1;

Figure 3 is a top plan view thereof;

Figure 4 is a longitudinal sectional view taken substantially along a plane as indicated by the line 4—4 of Figure 3, and Figure 5 is a cross sectional view taken substantially along a plane as indicated by the line 5—5 of Figure 1.

The circular hole cutting attachment in its entirety is designated generally 7 and includes a rod 8 of circular cross section which is threaded from end-to-end thereof and which is provided adjacent one end with a bore 9 extending diametrically therethrough and adjacent its opposite end with a larger diametrical bore 10. The rod 8 is provided with a straight groove or channel 11 which extends from end-to-end thereof and which intersects corresponding ends of the diametrical bores 9 and 10 and is disposed diametrically thereof. The ends of the rod 8 are provided with longitudinally extending threaded bores 12 which open outwardly of the terminals of said rod. The inner end of one bore 12 opens into the intermediate portion of the bar 9 and the inner end of the other bore 12 opens into the intermediate portion of the bore 10.

An elongated drill bit retaining screw 13 is threaded into the bore 12 toward the diametrical bore 9, disposed adjacent thereto, and has a restricted unthreaded shank portion 14 at its inner end. The outer end of the retaining screw 13 is provided with a kerf 15. A jamb nut 16 is mounted on the screw 13 beyond the adjacent end of the rod 8 to retain the screw 13 in an adjusted position. A corresponding screw 13a is mounted in the other threaded bore 12 and likewise carries a jamb nut 16a.

With the screw 13 backed off, a drill bit 18 is inserted through the bore 9, said bit 18 being of proper size to fit relatively snug in the bore 9. The screw 13 is then advanced inwardly so that its restricted shank 14 will seat in a flute groove of the bit 18 to clamp the bit in the bore and diametrically of the rod 8 and the jamb nut 16 is then advanced to retain the screw 13 in an advanced position. Before application of the bit 18 to the bore 9, a nut 19, washer 20 and cutting implement, designated generally 21, is applied to the rod 8 and positioned to the left of the bore 9, as seen in Figures 1, 3 and 4. The nut 19 is threaded on the rod 8 and the washer 20 is disposed between the nut 19 and cutting unit 21 and said cutting unit 21 is disposed between the washer and bore 9 and accordingly between said washer and the bit 18, after application of the bit. The washer 20 is provided with a tongue 22 which extends into the opening thereof and which slidably engages the groove or channel 11 for nonrotatably mounting the washer 20 on the rod 8. The cutting unit 21 includes an annular hub 23 which is turnably disposed on the rod 8 and which has three cutting blades 24, 25 and 26 extending radially from the hub 23 and which are equally spaced from one another circumferentially of the hub. Certain of the blades may have a pointed outer end forming the cutting portion thereof and which is beveled on two sides as seen at 27 and 28 so that the cutting point 29 of the blade is disposed at the side thereof remote to the bit 18 and contiguous with one edge of the blade disposed at a right angle to said aforementioned outer side.

A sleeve 30 is provided with a bore sized to slidably engage on the rod 8 and is insertable thereon from the right-hand end of the rod. The sleeve 30 is provided with diametrically aligned notches 31 which extend longitudinally thereof from adjacent its right-hand end and which open outwardly of its left-hand end. The notches 31 are of a width slightly greater than the diameter of the bit 18 so that portions of the bit extend through said notches and to permit the sleeve 30 to slide relatively to the bit 18 and to be positioned on the rod 8 with the ends of the sleeve 30 disposed on opposite sides of the bit 18. As seen in Figures 3 and 4, each of the notches 31 is of a length at least equal to the diameter of the bit 18 plus the thickness of the nut 19 and washer 20. A nut 32 is threaded onto the rod 8 to the right of the sleeve 30 and a split lock washer 33 is mounted on the rod 8 between the sleeve 30 and nut 32.

A nut 19a, washer 20a and cutting unit 21a is applied to the other left-hand end of the rod 8 and displaced to the right beyond the bore 10, said parts corresponding to the nut 19, washer 20 and cutting unit 21, respectively, with the exception that the blades of the cutting unit 21 in addition to being of different lengths relatively to one another may likewise be of different lengths as compared to the lengths of the blades of the cutting unit 21. A drill bit 18a of a proper diameter to snugly engage the bore 10 is applied to said bore and is secured in adjusted positions therein by advancing the retaining screw 13a, as previously described in reference to the screw 13, so that the restricted screw shank 14a will engage tight in a flute groove of the bit 18a. The cutting unit 21a is disposed between the washer 20a and the bit 18a and said washer is disposed between the cutting unit 21a and nut 19a. A sleeve 30a, shorter than the sleeve 30, is mounted on the rod 8 and is applied thereto from the left end of the rod and has diametrically aligned notches 31a which open outwardly of its inner end and which are each of a width to receive the bit 18a and of a length no greater than the diameter of the bit. A nut 32a is threaded onto the rod 8 to the left of the sleeve 30a and a washer 33a, corresponding to the washer 33, is disposed on the rod 8 between the sleeve 30a and nut 32a.

It is to be understood that when the bit 18 is utilized it is employed with the parts disposed adjacent thereto and the bit 18a is removed together with the parts located adjacent said bit 18a. The upper shank end of the bit 18 is secured in a drill chuck 17 which may form a part of a drill press, not shown, and the jaws of the drill chuck may extend downwardly to and abut against the upper portion of the sleeve 30 and will not interfere with the cutting unit 21 since one of the blades thereof will be extending downwardly, for example the blade 24, and the other two blades thereof will be projecting outwardly and upwardly at an incline and will be so disposed as not to interfere with or be engaged by the chuck 17. By tightening the nuts 19 and 32, the cutting blade 24 which is disposed in an operative position below the rod 8 will be retained at a predetermined distance radially from the axis of the bit 18 and will be held against swinging relatively to the rod 8 by the sleeve 30 and the lock washer 20, as the former is retained against rotation on the rod 8 by the bit 18 engaging its notches 31 while the latter is held non-rotatably on the rod 8 by its tongue 22 engaging in the groove or channel 11. Assuming that a piece of material, not shown, is disposed below the bit 18 clamped to a supporting surface such as a drill press table, not shown, as the bit 18 is revolved and displaced downwardly by operation of the drill press or other machine or implement to which the chuck 17 is attached, the drill 18 will initially bore a hole into the work after which the point 29 of the blade 24 will move into contact with the work and execute a circular cut therein about the axis of the drill bit 18 as a center for cutting a circular hole through a workpiece of a diameter substantially greater than the diameter of the drill bit 18. It will be readily apparent that the diameter of the hole thus cut may be enlarged by loosening the nut 19 and advancing the nut 32 from right to left until the bit 18 engages the inner ends of the notches 31, or the nut 32 may be backed off from left to right and the nut 19 advanced in the same direction up to the limit where the hub 23 abuts the bit 18 for reducing the diameter of the hole cut by the bit 18 and cutting unit 21.

Similarly, the bit 18a may be employed with the parts shown at the left-hand end of the rod 8 and with the chuck 17 applied to the upper shank end of the bit 18a and in which case the bit 18 and the parts associated therewith and mounted on the right-hand end of the rod 8 are omitted. The bit 18a and its associated parts are employed for cutting only very small holes of the diameter of the bit 18a plus twice the thickness of the cutting unit 21a and measured radially from the bit 18a, since the notches 31a are each of a length only equal to the diameter of the bit 18a so that the inner end of the sleeve 30a is incapable of projecting to the right beyond the bit 18a and therefore cannot space the cutter 21a from said bit. However, such spacing may be accomplished by inserting additional washers 20a between the right-hand end of the sleeve 30a and the cutting unit 21a. Similarly, the cutter 21 may be spaced a greater distance from the bit 18 than is provided for by the notches 31 of the sleeve 30 by inserting additional washers 20 between the cutting unit 21 and the left-hand end of the sleeve 30.

The cutting units 21 and 21a are provided with blades of different lengths for use in cutting through workpieces of different thicknesses and in each instance the point of the blade employed is disposed above the level of the leading, lower end of the bit so that the bit may initially be started in the work before the blade commences to execute its circular cutting operation.

While the bit 18 is anchored in the rod 8 normally only by the retaining screw 13, unless the sleeve 30 is moved to the left as far as possible, the bit 18a is anchored not only by the screw 13a but additionally by the sleeve 30a which is held in gripping engagement therewith by the nut 32a and washer 33a.

It is also possible to cut very large holes with either bit by omitting the cutting unit normally associated therewith and by utilizing the cutting unit and associated parts of the other bit but with the other bit removed. The boring of large holes can also be accomplished by removing the unit at the right-hand end of rod 8 (Figures 1, 2 and 3) except the nut 32 and washer 20, and then repositioning the parts so that the nut 19a will be to the left of the bit 18a and sleeve 30a, the cutting unit 21a being located between the nuts 19a and 32 and to the right of nut 19a, and the washers 20a and 20 being disposed between the cutting unit 21a and the nuts 19a and 32, respectively.

Various modifications and changes are contemplated and may obviously be resorted to, without departing from the spirit or scope of the invention as hereinafter defined by the appended claims.

I claim as my invention:

1. A circular hole cutting attachment for drill bits comprising a rod of circular cross section externally threaded from end-to-end thereof having a bore extending diametrically therethrough adjacent one of its ends and a longitudinally extending threaded bore opening outwardly of said end and into said diametrical bore, said diametrical bore being adapted to detachably receive and snugly engage a portion of a drill bit, a retaining screw threadedly engaging said threaded bore and having a restricted inner end adapted to engage in a flute groove of the bit for detachably securing the rod rigidly to the bit, a sleeve slidably mounted on the rod having diametrically aligned longitudinally extending notches opening outwardly of one end of the sleeve adapted to accommodate portions of the drill bit, a pair of nuts threadedly engaging said rod beyond the ends of the sleeve, a washer slidably mounted on the rod between one of the nuts and the adjacent sleeve end, a lock washer mounted on the rod between the opposite end of the sleeve and the other nut, and a cutting unit having an annular hub slidably mounted on the rod between the first mentioned end of the sleeve and the first mentioned washer, said cutting unit having a blade projecting from the hub provided with a cutting portion at its outer end adapted to cooperate with a leading end of the bit for cutting a circular opening and terminating nearer the axis of the rod than the leading bit end.

2. A cutting attachment as in claim 1, said notches of the sleeve each being of a length substantially greater than the diameter of the drill bit.

3. A cutting attachment as in claim 1, said notches of the sleeve each being of a length no greater than the diameter of the drill bit.

4. A cutting attachment as in claim 1, said rod having a groove extending from end-to-end thereof, said first mentioned washer being provided with a tongue extending into the opening thereof, said tongue slidably engaging the rod groove for nonrotatably mounting the washer on the rod.

5. A circular cutter attachment as in claim 1, and a jamb nut threadedly engaging the exposed end of the retaining screw and abutting the end of the rod from which said screw projects for retaining the inner end of the screw in engagement with the drill bit.

6. A circular cutting attachment as in claim 1, said cutting unit including a plurality of blades projecting radially from the hub and equally spaced from one another circumferentially of the hub, said blades being of different lengths and each having a cutting portion at its outer end, said cutting portions being spaced different distances from the axis of the hub.

LOUIS MASINI.

No references cited.